(12) United States Patent
Chen et al.

(10) Patent No.: US 9,703,402 B2
(45) Date of Patent: Jul. 11, 2017

(54) COMPUTER PERIPHERAL DEVICE

(71) Applicant: DEXIN CORPORATION, New Taipei (TW)

(72) Inventors: Yi-Shun Chen, New Taipei (TW); Chiu-Tai Chang, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 14/886,993

(22) Filed: Oct. 19, 2015

(65) Prior Publication Data

US 2017/0108945 A1      Apr. 20, 2017

(51) Int. Cl.
| | | |
|---|---|---|
| G06F 3/0362 | (2013.01) | |
| G06F 3/0354 | (2013.01) | |
| G06F 3/0338 | (2013.01) | |
| G06F 3/02 | (2006.01) | |

(52) U.S. Cl.
CPC ............ G06F 3/0362 (2013.01); G06F 3/021 (2013.01); G06F 3/0338 (2013.01); G06F 3/03543 (2013.01)

(58) Field of Classification Search
USPC .................................................. 345/163, 168
See application file for complete search history.

(56) References Cited

U.S. PATENT DOCUMENTS

| | | | | |
|---|---|---|---|---|
| 2004/0100511 A1* | 5/2004 | Wong | .................... | G06F 1/1622 715/866 |
| 2005/0078087 A1* | 4/2005 | Gates | .................. | G06F 3/03543 345/163 |
| 2005/0134566 A1* | 6/2005 | Nian | ..................... | G06F 3/0485 345/163 |
| 2005/0259077 A1* | 11/2005 | Adams | .................. | G06F 3/0213 345/163 |
| 2007/0120827 A1* | 5/2007 | Salpietra | .............. | G09B 21/003 345/168 |
| 2009/0231275 A1* | 9/2009 | Odgers | ................... | G06F 1/162 345/157 |
| 2010/0041479 A1* | 2/2010 | Hsu | ......................... | A63F 13/10 463/36 |
| 2010/0085306 A1* | 4/2010 | Wu | ....................... | G06F 3/0312 345/163 |
| 2010/0127988 A1* | 5/2010 | Park | ....................... | G06F 3/018 345/168 |
| 2011/0028194 A1* | 2/2011 | Tang | ................... | G06F 3/03543 463/1 |

(Continued)

*Primary Examiner* — Tony Davis
(74) *Attorney, Agent, or Firm* — Li & Cai Intellectual Property (USA) Office

(57) ABSTRACT

A computer peripheral device includes a housing, and at least one multi-directional key-wheel. The multi-directional key-wheel is rotatably arranged along an axis in an abreast manner in the housing, and has a part exposed outside the housing. Each multi-directional key-wheel is polygon-shaped and has a plurality of pressing surfaces. Each pressing surface is equipped with at least one button. At least two pressing surfaces of one multi-directional key-wheel have a different quantity of buttons. Thus, the present invention can provide different button arrangement modes by exposing a different one of the pressing surfaces of the multi-directional key-wheel outside the housing. The button arrangement modes can also have a different quantity and arrangement manner of the keys.

7 Claims, 10 Drawing Sheets

(56) References Cited

U.S. PATENT DOCUMENTS

| | | | |
|---|---|---|---|
| 2011/0035380 A1* | 2/2011 | Stafford | G06F 3/04847 707/740 |
| 2011/0163959 A1* | 7/2011 | Liu | G06F 3/03543 345/166 |
| 2011/0216005 A1* | 9/2011 | Lin | G06F 3/02 345/168 |
| 2011/0279954 A1* | 11/2011 | Sendora | G06F 1/1616 361/679.01 |
| 2012/0105329 A1* | 5/2012 | Chang | G06F 3/0383 345/163 |
| 2013/0057474 A1* | 3/2013 | Li | G06F 3/03543 345/163 |
| 2013/0307777 A1* | 11/2013 | Liu | G06F 3/0383 345/163 |

\* cited by examiner

COMPUTER PERIPHERAL DEVICE

BACKGROUND OF THE INVENTION

1. Field of the Invention

The present invention is related to a computer peripheral device. In particular, the present invention relates to a computer peripheral device having a plurality of button configuration modes for adjusting the number of buttons by the users themselves, which can satisfy various hot-key settings by using a different number of buttons.

2. Description of Related Art

To conveniently operate a computer, there are more and more computer peripheral devices being developed and improved, such as a keyboard, computer mouse, joystick . . . etc. To take the computer mouse as an example, it usually has a scrolling wheel, a left button and a right button, which are used to control windows scrolling, and operate the predetermined-function of various quick shortcut links.

There are some conventional computer mice which are additionally equipped with buttons at one side thereof, so as to quickly operate some function. The side button is usually arranged at one side of the computer mouse, the number of side button is fixed, for example, at least one, or up to twelve buttons. The side button can have the function of viewing web pages more conveniently, and improves the effect for a computer game that needs a plurality of hot-keys. Especially, many side buttons can enhance the effect of the MMORPG (Massively Multiplayer Online Role Playing Game). In addition, the hot-keys also can be applied in word processing. Concerning the software setting function of MMORPG, the basic functions are a function-set of the side buttons, or a DPI (Dots per inch) value setting, and the most complex function is key micro recording.

However, the number of the side buttons is fixed. A computer mouse having less side buttons may not be able to handle the complex functions of computer games. A computer mouse having an excessive number of side buttons may leave some buttons unused. Therefore, it is hard to fulfill the many kinds of hot-key setting requirements of different users. As the computer software is developed quickly, it is hard to fulfill the same user's requirements for different hot-key setting.

SUMMARY OF THE INVENTION

It is one objective of this invention to provide a computer peripheral device, having a multi-directional key-wheel, which can be adjusted by the user to change the number of buttons and different button configuration modes, so as to fulfill the variety of hot-key settings.

In order to achieve the above objectives, according to one exemplary embodiment of the instant disclosure, the instant disclosure is to provide a computer peripheral device, including a housing and at least one multi-directional key-wheel. The at least one multi-directional key-wheel is arranged in the housing along an axis side by side and partially exposed outside the housing. Each multi-directional key-wheel is polygon-shaped and has a plurality of pressing surfaces. Each of the pressing surfaces is equipped with at least one button. At least two of the pressing surfaces of each multi-directional key-wheel have different quantity of buttons. Therefore, the at least one multi-directional key-wheel has one of the pressing surfaces exposed outside the housing, to changeably provide a plurality of button configuration modes. The button configuration modes have a different number and arranging manner of the buttons.

Thus, the instant disclosure has the advantages as follows. The multi-directional key-wheel can expose a different one of the pressing surfaces outside the housing of the computer peripheral device, so as to provide many changeable kinds of button configuration modes. A user can conveniently customize one button configuration mode to what he wants.

For further understanding of the instant disclosure, reference is made to the following detailed description illustrating the embodiments and examples of the instant disclosure. The description is for illustrative purpose only and is not intended to limit the scope of the claim.

DETAILED DESCRIPTION OF THE PREFERRED EMBODIMENTS

[First Embodiment]

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
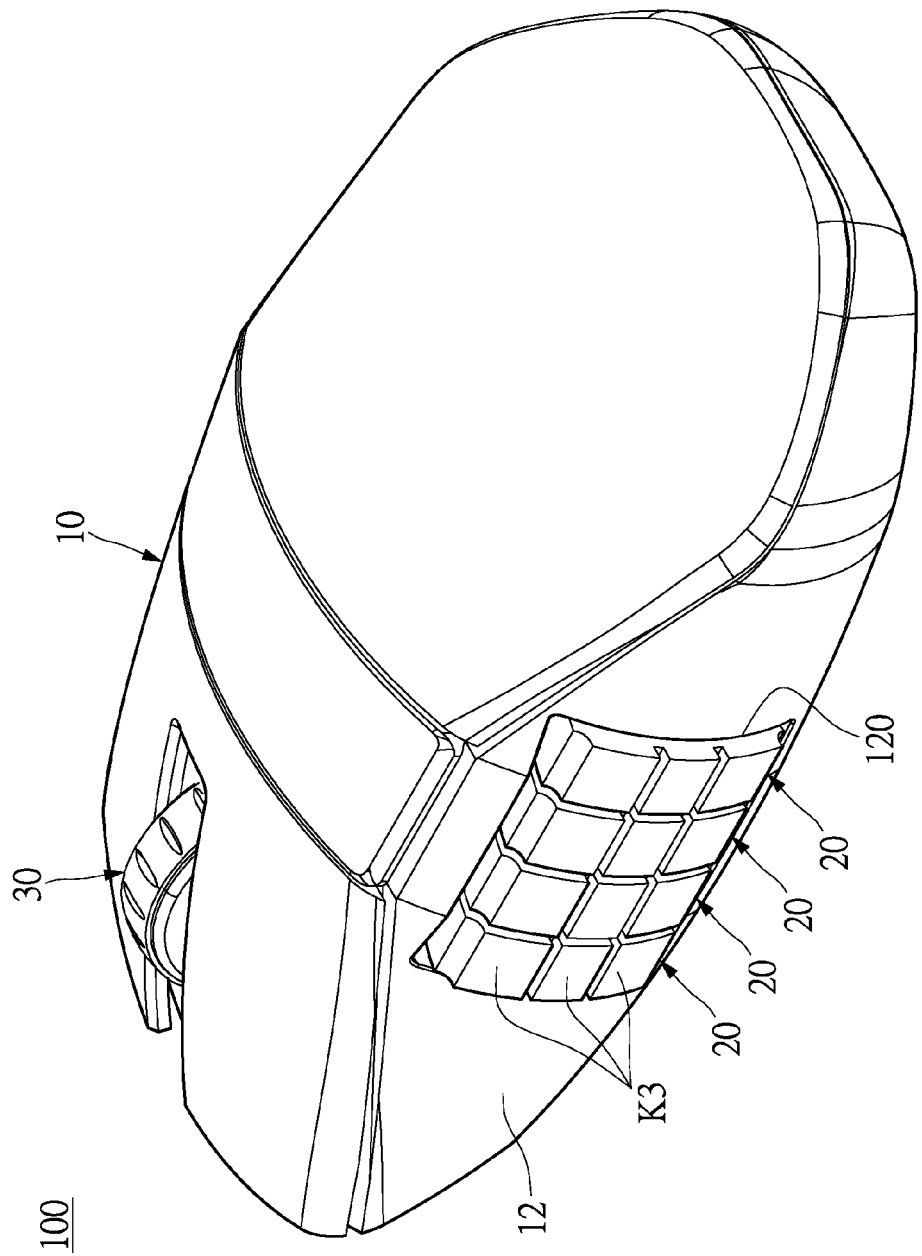
FIG. 1 is a perspective view of computer peripheral device of first embodiment according to the present disclosure.
Figure 2:
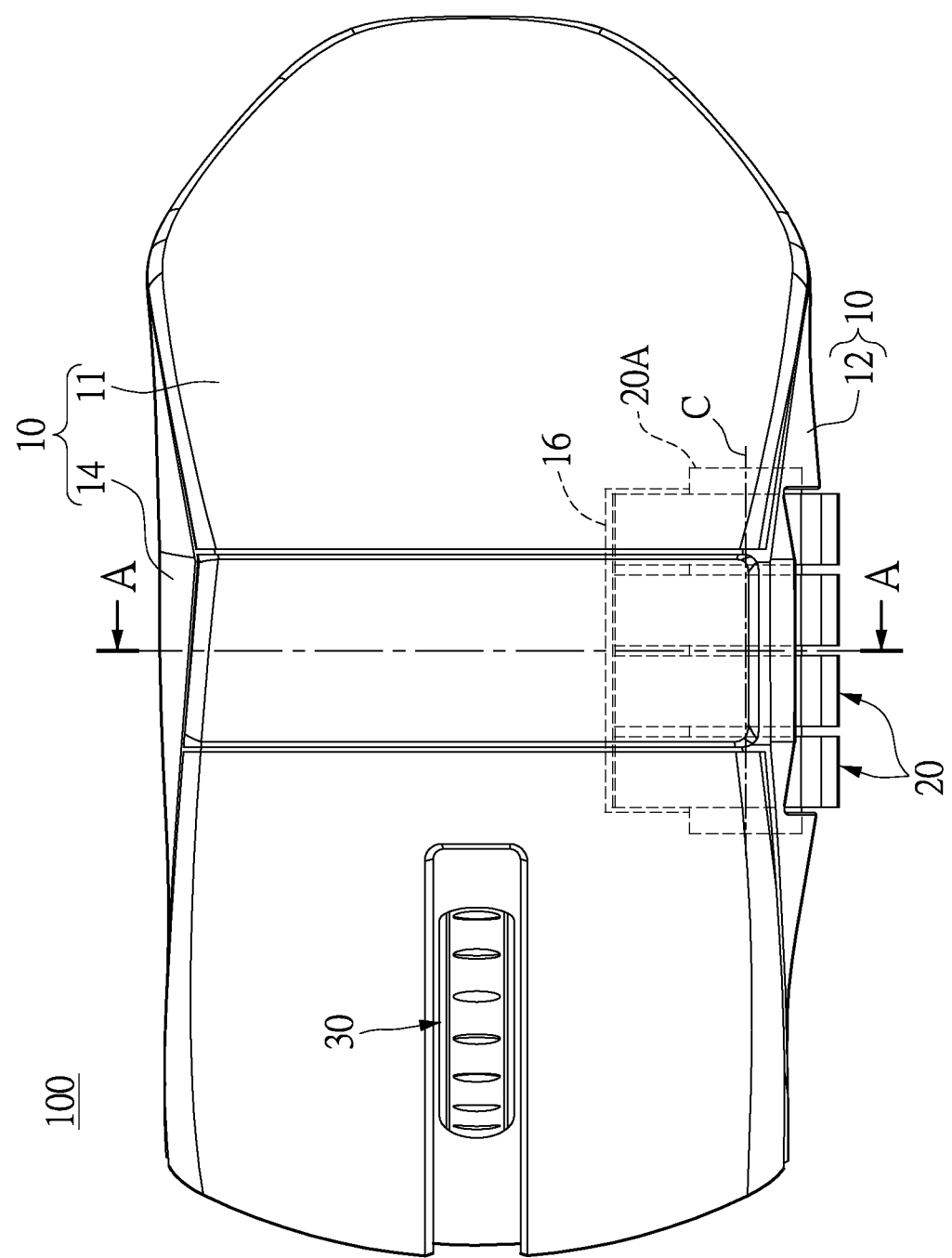
FIG. 2 is a top view of computer peripheral device according to the present disclosure.

Refer to FIG. 1 and FIG. 2, which are a perspective view and top view of a computer peripheral device according to the present disclosure. This embodiment provides a computer peripheral device 100, for example a computer mouse, but it is not limited to a computer mouse. This present disclosure also can be applied in other computer peripheral devices, such as keyboards, joysticks . . . etc. In this embodiment, the computer peripheral device 100 includes a housing 10, a plurality of multi-directional key-wheels 20, and a scrolling wheel 30. This embodiment has four multi-directional key-wheels 20, but it can be one or more.

The multi-directional key-wheels 20 are arranged along an axis C side by side and rotatably disposed in the housing 10. A part of the multi-directional key-wheel 20 is exposed outside the housing 10. According to the computer mouse of this embodiment, the housing 10 has a top wall 11 and two side walls 12, 14 connected to the top wall 11. The side wall 12 is formed with an opening 120, and the multi-directional key-wheels 20 are exposed outside the opening 120 of the side wall 12. In the condition of a left-hand user, the multi-directional key-wheels 20 can be exposed outside the other side wall 14. The axis C of the multi-directional key-wheels 20 is substantially arranged along a longitudinal direction of the side wall 12. Each multi-directional key-wheel 20 may have a side view like an olive shape with two pressing surfaces, or like a polygon shape with a plurality of pressing surfaces.

Figure 1A:
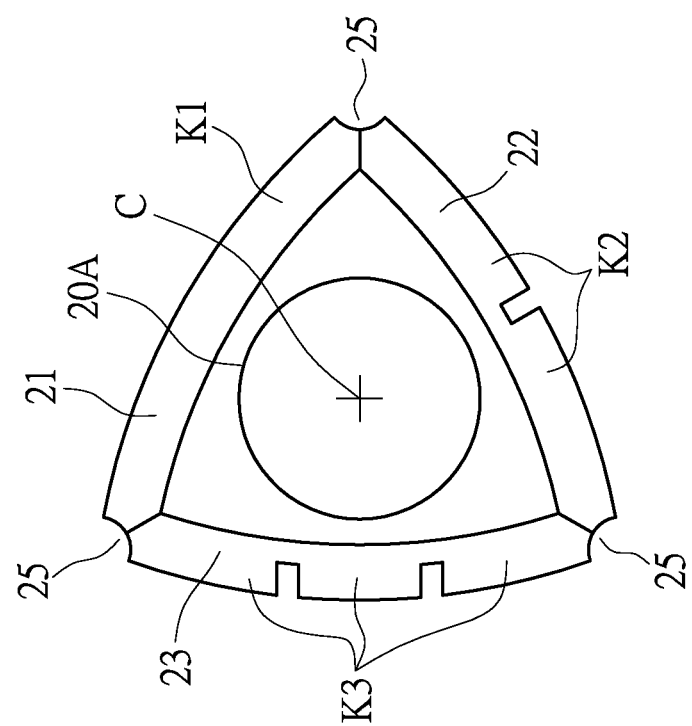
FIG. 1A is a perspective view of multi-directional key-wheel according to the present disclosure.

As shown in FIG. 1A, the multi-directional key-wheel 20 of this embodiment is substantially triangle-shaped, and has an axial portion 20A and three pressing surfaces 21, 22, 23. Each of the pressing surfaces 21, 22, 23 is arc-shaped. The multi-directional key-wheel 20 has three corners, and each corner is formed with a concave portion 25. Each concave portion 25 is arranged between two neighbor pressing surfaces (21, 22; or 21, 23; or 22, 23). The concave portion 25 makes it convenient for a user to rotate the multi-directional key-wheel 20. Each of the pressing surfaces 21, 22, 23 has at least one button. One characteristic of the present disclosure is that at least two pressing surfaces of the multi-directional key-wheel 20 have a different number of buttons. In this embodiment, the pressing surface 21 has one button K1, the pressing surface 22 has two buttons K2, and the pressing surface 23 has three buttons K3. The button K1 has a bigger area and is more convenient to press. The pressing surface 23 has three buttons K3, which can be conveniently set to more hot-keys. The aforementioned button could be a micro key switch, for example, a key structure type applied in the mobile phone.

The arrangement of the buttons in this present disclosure is not limited by the aforementioned button configuration numbers distributed on the pressing surfaces. The three pressing surfaces can be equipped with "one, one, two" buttons or "two, two, three" buttons. The number of buttons can be changed according to the size of the pressing surface. This embodiment is applied to the computer mouse, so according to the size of the side wall and thumb pressing convenience, the number of the buttons on each pressing surface preferably is three or under. In addition, the number of the multi-directional key-wheels 20 can be four, but an excessive number may cause inconvenient thumb operation.

Figure 2A:
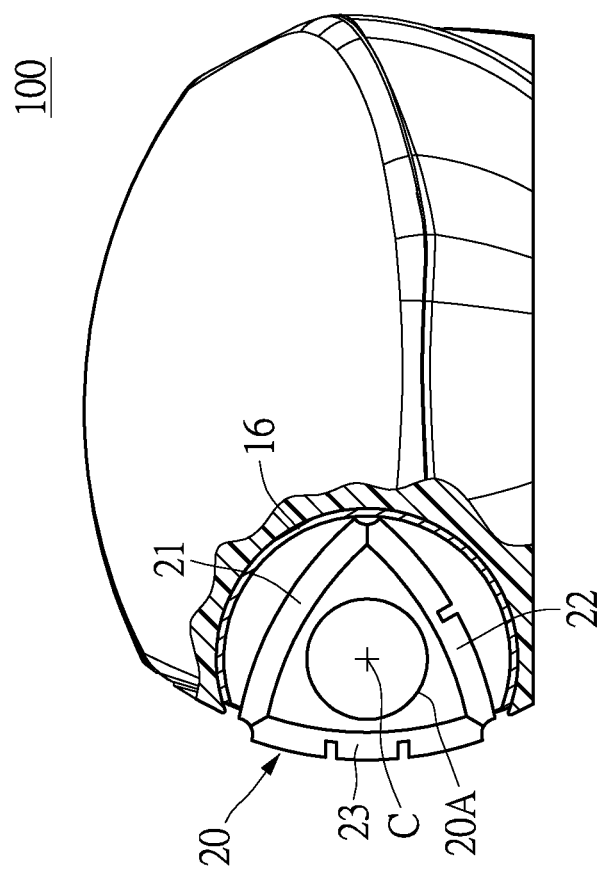
FIG. 2A is a partial cross-sectional view along line A-A of FIG. 2 according to the present disclosure.

Refer to FIG. 2 and FIG. 2A. FIG. 2A is a cross-sectional view along line A-A of FIG. 2 according to the present disclosure. The housing 10 has a cylinder portion 16 formed therein and connected to an inner side of the side wall 12. The multi-directional key-wheels 20 are rotatably arranged in the cylinder portion 16. The axial portion 20A passes through all of the multi-directional key-wheels 20. Each multi-directional key-wheel 20 is independently rotatable related to the axial portion 20A.

Figure 3:
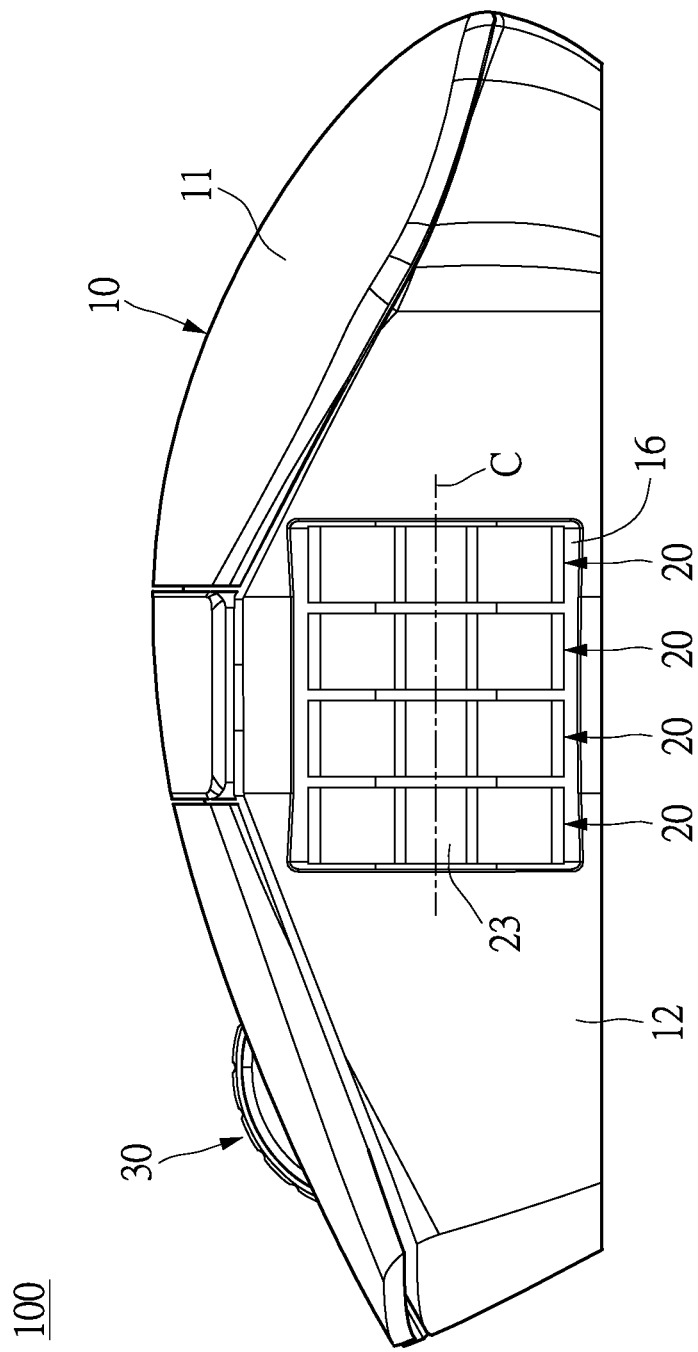
FIG. 3 is a side view of computer peripheral device with a first kind of button configuration mode according to the present disclosure.
Figure 4:
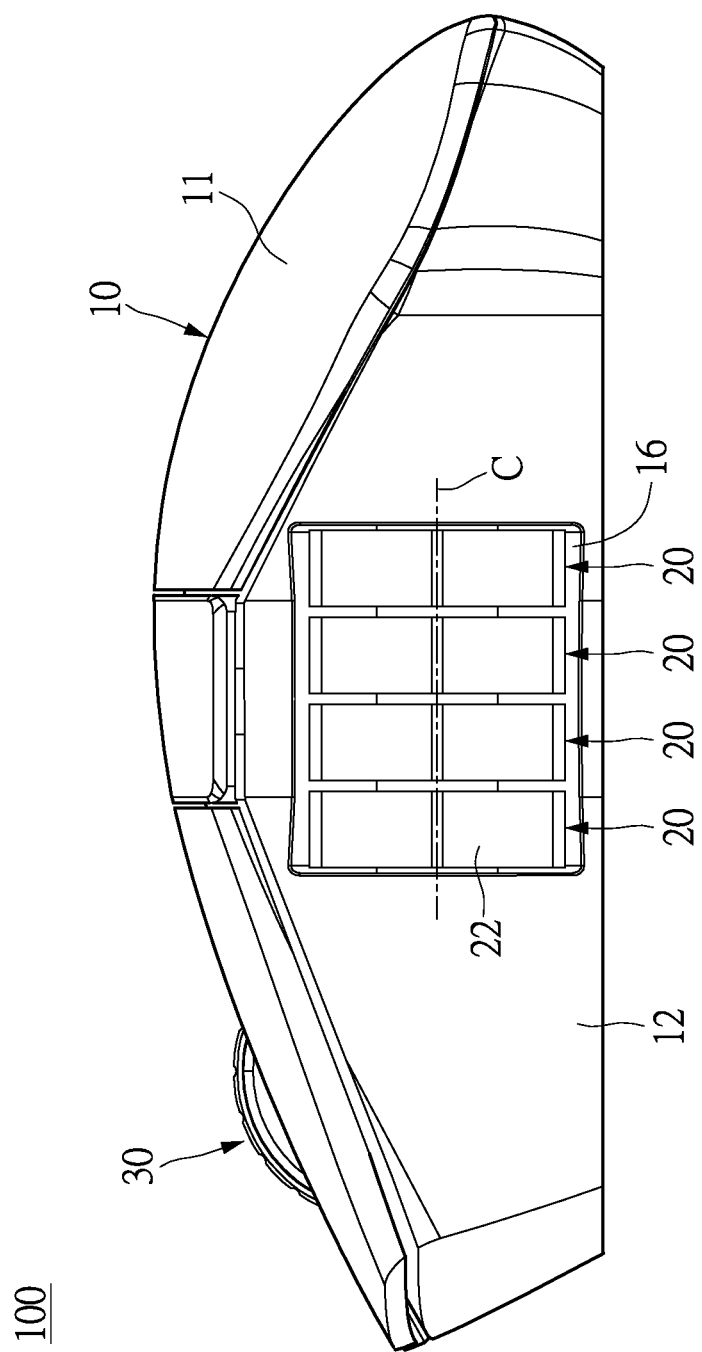
FIG. 4 is a side view of computer peripheral device with a second kind of button configuration mode according to the present disclosure.
Figure 5:
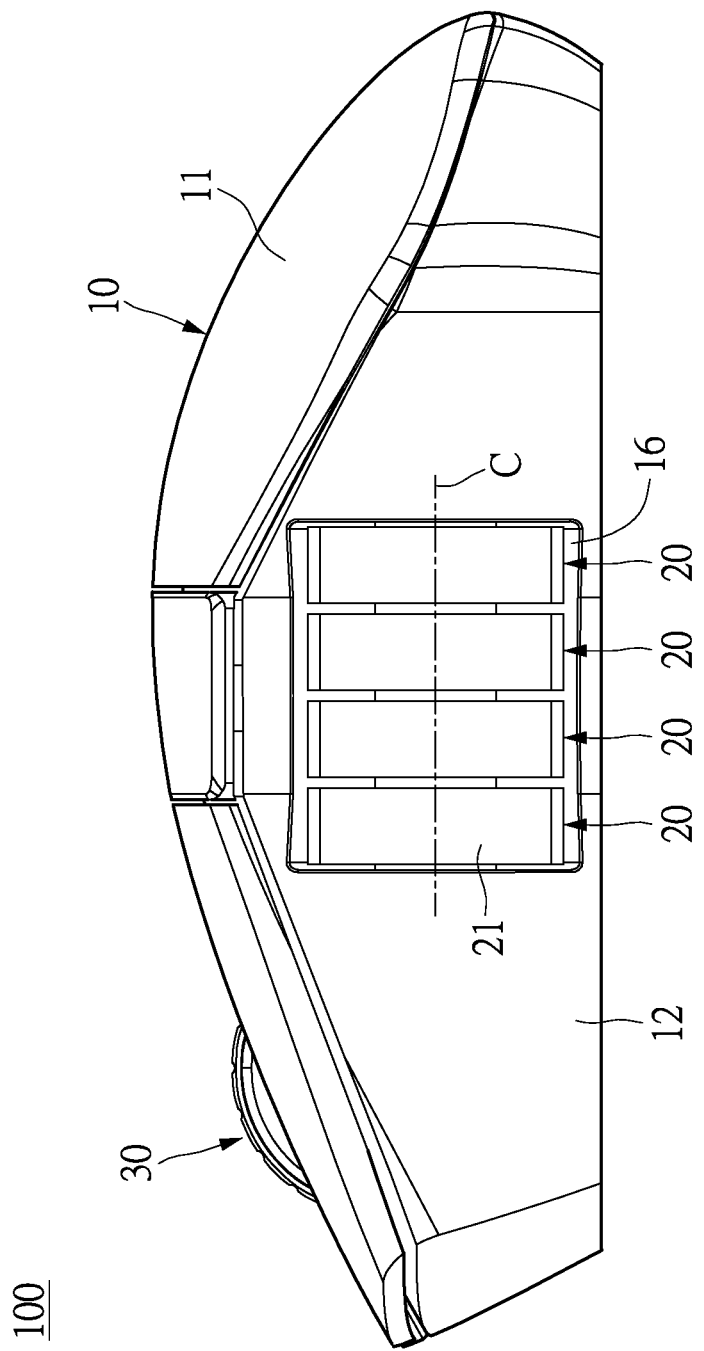
FIG. 5 is a side view of computer peripheral device with a third kind of button configuration mode according to the present disclosure.

Refer to FIG. 3 to FIG. 5. By rotatably arranging the multi-directional key-wheels 20 in the computer peripheral device 100, each multi-directional key-wheel 20 exposes one of the pressing surfaces (21, 22 or 23) outside the housing 10, so that there are many different button configuration modes. Each kind of button configuration mode can have a different number and different combinations of buttons, which can coordinate with different hot-key setting requirements of software or computer games.

This embodiment provides some examples of button configuration modes as follows. As shown in FIG. 3, a first type of button configuration mode has four multi-directional key-wheels 20 which expose the pressing surfaces 23 with three buttons respectively, and so the total has twelve buttons. As shown in FIG. 4, a second type of button configuration mode has four multi-directional key-wheels 20 which expose the pressing surfaces 22 with two buttons respectively, and so the total has eight buttons. As shown in FIG. 5, a third type of button configuration mode has four multi-directional key-wheels 20 which expose the pressing surfaces 21 with one button respectively, and so the total has four buttons. Therefore, the multi-directional key-wheels 20 of the computer peripheral device 100 can be customized by a user to set a hot-key according to different requirements of software or computer games. The multi-directional key-wheels 20 can be adjusted according to the required number of hot-keys for setting various hot-key functions by a user. There are no buttons left unused exposed outside the housing 10. The user even can rearrange the positions of buttons according to user's preference to form a different button configure mode.

According to the four multi-directional key-wheels 20 in this embodiment, each of the three pressing surfaces 21, 22, 23 has one, two and three buttons, and each of the four multi-directional key-wheels 20 has three kinds of modes. This embodiment totally can provide 3*3*3*3=81 kinds of button configuration modes. Thus, this present disclosure provides a computer mouse with revolver-type side keys, which can be applied to a MMORPG (Massively Multi-player Online Role Playing Game), so that players can customize the configuration of buttons of their computer mouse.

Figure 6:
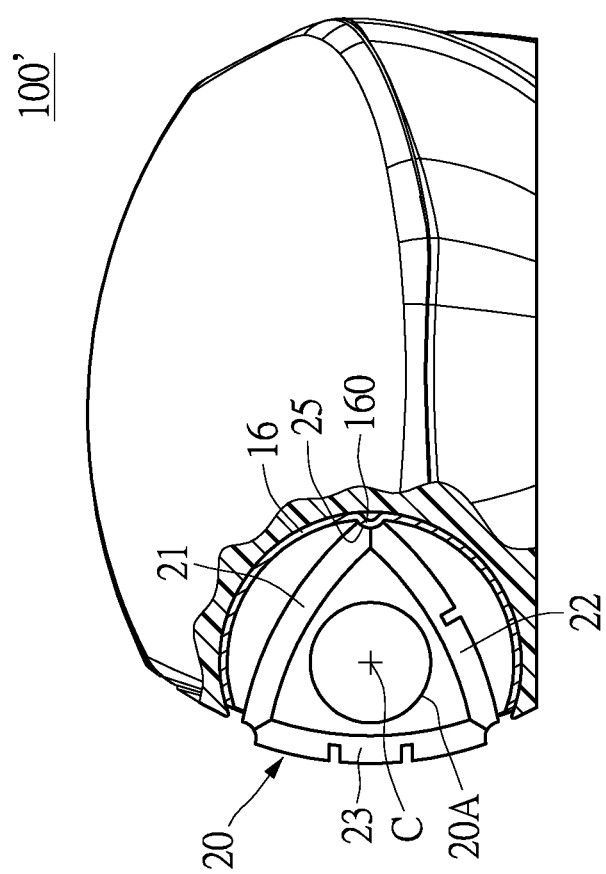
FIG. 6 is a cross-sectional view of computer peripheral device with a positioning mechanical according to the present disclosure.

Refer to FIG. 6, which is a cross-sectional view of a computer peripheral device with a positioning mechanism according to the present disclosure. This embodiment provides a computer peripheral device 100' having a housing 10. The housing 10 preferably is formed with a positioning mechanism to fix the multi-directional key-wheels 20, so that the multi-directional key-wheels 20 can be fixed to avoid a shifting rotation during operation. The multi-directional key-wheels 20 of this embodiment are formed with a plurality of concave portions 25, and the concave portions 25 are arranged between two neighbor pressing surfaces (for example 21 and 22, 21 and 23, or 22 and 23). The cylinder portion 16 is protruded with a protrusion 160 toward the multi-directional key-wheel 20 as a positioning mechanism. The protrusion 160 is fixedly disposed on one of the concave portions 25 to fix the multi-directional key-wheel 20. Therefore, it can increase the stability of the multi-directional key-wheels 20. However, the present disclosure is not limited by the aforesaid positioning mechanism. For example, the positioning mechanism can be formed on the axial portion 20A or the side wall 12.

[Second Embodiment]

Figure 7:
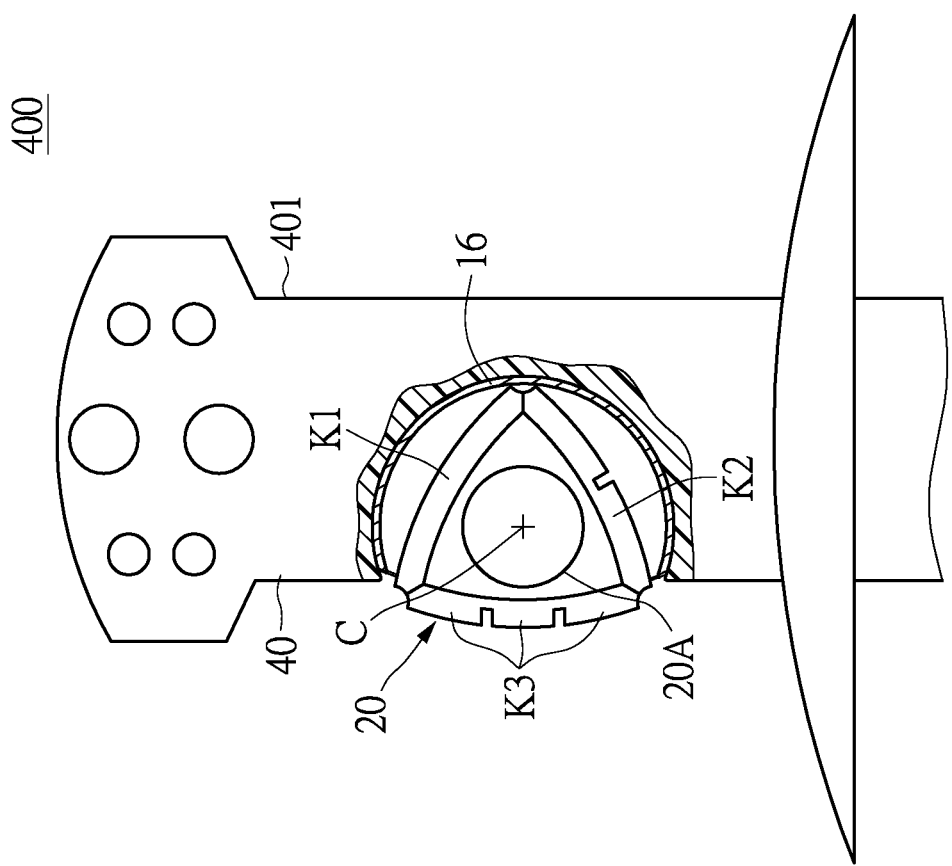
FIG. 7 is a perspective view of computer peripheral device of second embodiment according to the present disclosure.

Refer to FIG. 7, which is a front view with a partial cross-section of a computer peripheral device of second embodiment of the present disclosure. In this embodiment, the computer peripheral device 400 can be applied to a joystick. The joystick has a stick 401. The stick 401 has a housing 40, and at least one multi-directional key-wheel 20 is arranged in the housing 40. The multi-directional key-wheel 20 is partially exposed outside the stick 401.

[Third Embodiment]

Figure 8:
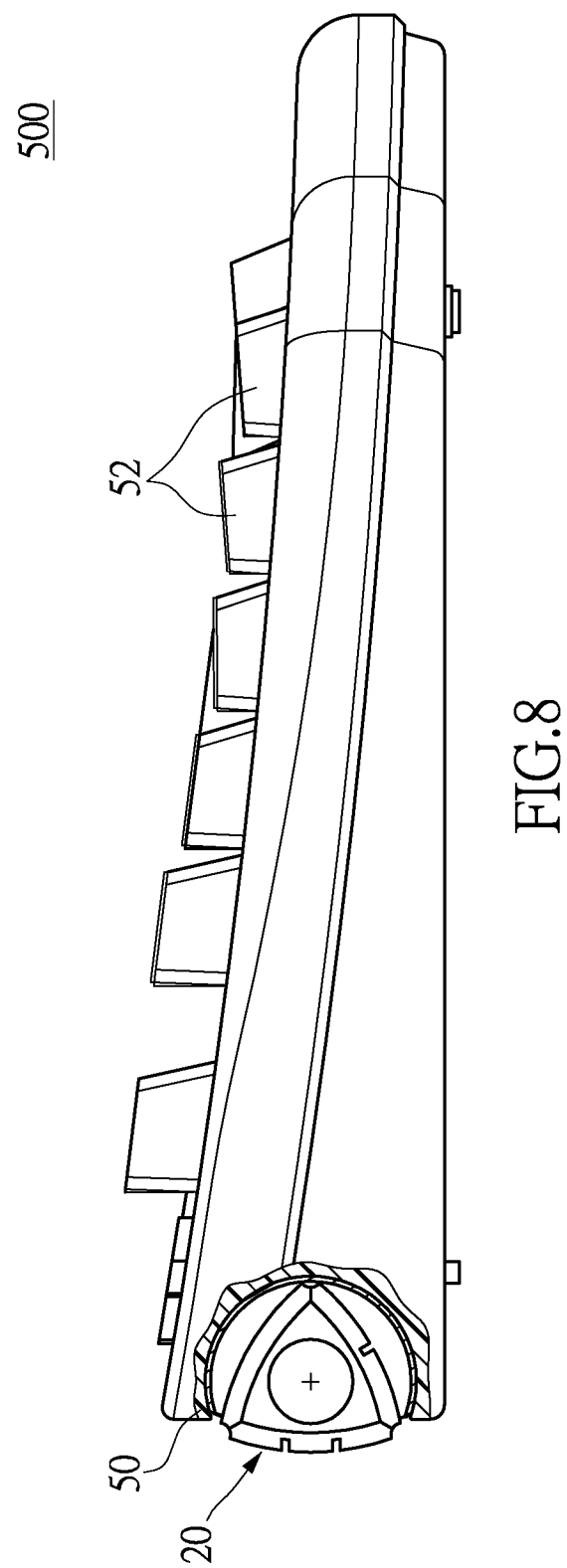
FIG. 8 is a perspective view of computer peripheral device of third embodiment according to the present disclosure.

Refer to FIG. 8, which is a side view with a partial cross-section of a computer peripheral device of a third embodiment of the present disclosure. In this embodiment, a computer peripheral device 500 is applied to a keyboard. The keyboard has a plurality of key units 52 arranged on a top surface thereof. The keyboard has a housing 50 and at least one multi-directional key-wheel 20 arranged in the housing 50. The multi-directional key-wheel 20 can be arranged at a front end of the keyboard and close to a side of the keyboard.

The present disclosure has characteristics and features as follows. The multi-directional key-wheels 20 can be rotated to expose one of the pressing surfaces (21, 22, and 23) outside the housing of the computer peripheral device, so as to provide many changeable kinds of button configuration modes. The button configuration modes have a different number and arranging manner of the buttons, so that a user can conveniently customize his style of button configuration mode to fulfill various hot-key settings.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A computer peripheral device, comprising:
    a housing; and
    at least one multi-directional key-wheel, being arranged in the housing along an axis side by side, partially exposed outside the housing, wherein each of the at least one multi-directional key-wheels is polygon-shaped and has a plurality of pressing surfaces, each of the plurality of pressing surfaces is equipped with at least one button; at least two of the plurality of pressing surfaces of each of the at least one multi-directional key-wheels has a different quantity of buttons;
    wherein the computer peripheral device is a computer mouse, the housing has a top wall and two side walls connected to the top wall, the at least one multi-directional key-wheel is exposed outside one of the side walls, the axis of the at least one multi-directional key-wheel is substantially along a longitudinal direction of one of the side walls serving as a thumb side, and a length of the at least one multi-directional key-wheel along the longitudinal direction substantially corresponds to a length of a human thumb;
    thereby the at least one multi-directional key-wheel has one of the plurality of pressing surfaces exposed outside the housing, to changeably provide a plurality of button configuration modes, the plurality of button configuration modes having different number and arranging manners of the buttons.

2. The computer peripheral device as claimed in claim 1, wherein each of the at least one multi-directional key-wheels is substantially triangle-shaped, and has three pressing surfaces, each of the three pressing surfaces is arc-shaped.

3. The computer peripheral device as claimed in claim 2, wherein the three pressing surfaces respectively have one, two, and three of the buttons.

4. The computer peripheral device as claimed in claim 2, wherein each of the at least one multi-directional key-wheels is formed with a plurality of concave portions, each of the plurality of concave portions arranged between two neighbor pressing surfaces.

5. The computer peripheral device as claimed in claim 2, wherein the number of multi-directional key-wheels is four.

6. The computer peripheral device as claimed in claim 1, wherein the housing has a cylinder portion connected to an inner side of the side wall, the at least one multi-directional key-wheels are rotatably arranged in the cylinder portion.

7. The computer peripheral device as claimed in claim 6, wherein the housing is formed with a positioning mechanism, wherein the at least one multi-directional key-wheel is formed with a plurality of concave portions, each of the plurality of concave portions is arranged between two neighbor of the pressing surfaces, the positioning mechanism is a protrusion protruded from the cylinder portion toward the at least one multi-directional key-wheel, the protrusion is disposed on one of the plurality of concave portions to fix the at least one multi-directional key-wheel.

\* \* \* \* \*